United States Patent
Bliss (10) Patent No.: US 9,910,518 B2
(45) Date of Patent: Mar. 6, 2018

(54) TRANSPARENCY AUGMENTED INDUSTRIAL AUTOMATION DISPLAY

(71) Applicant: ROCKWELL AUTOMATION TECHNOLOGIES, INC., Mayfield Heights, OH (US)

(72) Inventor: Ronald Bliss, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 343 days.

(21) Appl. No.: 14/504,405

(22) Filed: Oct. 1, 2014

(65) Prior Publication Data
US 2016/0098108 A1 Apr. 7, 2016

(51) Int. Cl.
| | | |
|---|---|---|
| G06F 3/00 | (2006.01) | |
| G06F 3/041 | (2006.01) | |
| G05B 23/02 | (2006.01) | |
| G06F 3/01 | (2006.01) | |
| G06F 3/14 | (2006.01) | |
| G06F 3/0481 | (2013.01) | |

(52) U.S. Cl.
CPC ......... G06F 3/041 (2013.01); G05B 23/0216 (2013.01); G06F 3/01 (2013.01); G06F 3/017 (2013.01); G06F 3/1407 (2013.01); G05B 2219/31472 (2013.01); G06F 3/0481 (2013.01); G06F 2200/1637 (2013.01)

(58) Field of Classification Search
CPC .................................... G06F 3/0481–3/0489
See application file for complete search history.

(56) References Cited

U.S. PATENT DOCUMENTS

| | | | | | |
|---|---|---|---|---|---|
| 5,543,588 | A | * | 8/1996 | Bisset | G06F 1/1626 178/18.06 |
| 5,651,107 | A | * | 7/1997 | Frank | G06F 3/0481 345/589 |
| 5,729,219 | A | * | 3/1998 | Armstrong | G06F 3/03547 340/7.55 |
| 6,798,429 | B2 | * | 9/2004 | Bradski | G06F 1/1626 345/156 |

(Continued)

FOREIGN PATENT DOCUMENTS

| | | |
|---|---|---|
| DE | 2 431 895 A1 | 3/2012 |
| DE | 2 431 916 A2 | 3/2012 |
| WO | 2012001605 A1 | 1/2012 |

OTHER PUBLICATIONS

Azuma, A Survey of Augmented Reality, Presence: Teleoperators and Virtual Environments, Aug. 1997, 48 pages, vol. 6, No. 4.

(Continued)

*Primary Examiner* — Steven B Theriault (57) ABSTRACT

An industrial automation display is provided. The industrial automation display in one example includes a substantially transparent display panel associated with and in view of an industrial automation process portion, a light-control layer formed as part of the substantially transparent display panel, and a display controller coupled to the light-control layer, with the display controller configured to receive industrial automation data related to the industrial automation process portion, generate industrial automation display data using at least a portion of the industrial automation data, and display the industrial automation display data on the light-control layer of the substantially transparent display panel, wherein the industrial automation display data is viewable in conjunction with the industrial automation process portion.

17 Claims, 9 Drawing Sheets

(56) References Cited

U.S. PATENT DOCUMENTS

| | | | | |
|---|---|---|---|---|
| 7,088,342 B2* | 8/2006 | Rekimoto | G06F 3/0488 | 345/169 |
| 7,205,959 B2* | 4/2007 | Henriksson | G09F 9/00 | 345/169 |
| 7,376,903 B2* | 5/2008 | Morita | G06F 3/011 | 600/424 |
| 7,730,413 B1* | 6/2010 | Engel | G06F 9/4443 | 345/619 |
| 7,956,819 B2* | 6/2011 | Tomisawa | G02B 27/2214 | 345/1.1 |
| 8,023,140 B2* | 9/2011 | Lapstun | B41J 3/445 | 345/173 |
| 8,054,391 B2* | 11/2011 | Ishikawa | G02F 1/13718 | 349/12 |
| 8,154,472 B2* | 4/2012 | Yamaguchi | G06F 3/1423 | 345/1.1 |
| 8,253,684 B1* | 8/2012 | Lloyd | G06F 3/017 | 345/156 |
| 8,362,992 B2* | 1/2013 | Kuhlman | G02F 1/13306 | 345/1.1 |
| 8,421,959 B2* | 4/2013 | Yoon | G02B 6/0036 | 349/65 |
| 8,493,364 B2* | 7/2013 | Charlier | G06F 1/1616 | 345/173 |
| 8,495,514 B1* | 7/2013 | Ludolph | G06F 3/0481 | 715/768 |
| 8,624,797 B2* | 1/2014 | Lee | G06F 1/1649 | 345/1.1 |
| 8,770,813 B2* | 7/2014 | Bohn | G02F 1/133615 | 362/601 |
| 8,854,802 B2* | 10/2014 | Robinson | G06F 1/1615 | 349/74 |
| 8,890,771 B2* | 11/2014 | Pance | G06F 1/1647 | 345/4 |
| 9,123,217 B2* | 9/2015 | Pinn | H04Q 1/09 | |
| 9,164,581 B2* | 10/2015 | Robinson | G06F 3/04815 | |
| 9,165,478 B2* | 10/2015 | Carro | G09B 21/001 | |
| 9,310,905 B2* | 4/2016 | Luo | G06F 3/041 | |
| 9,324,134 B2* | 4/2016 | Kim | G06T 3/60 | |
| 9,338,525 B2* | 5/2016 | Pinn | | |
| 9,367,195 B1* | 6/2016 | Rabe | G06F 3/048 | |
| 9,519,371 B2* | 12/2016 | Nishida | G06F 3/04886 | |
| 2001/0031640 A1* | 10/2001 | Waller | H04W 4/02 | 455/456.3 |
| 2002/0044152 A1* | 4/2002 | Abbott, III | G06T 11/00 | 345/629 |
| 2002/0101447 A1* | 8/2002 | Carro | G06Q 10/10 | 715/760 |
| 2002/0180767 A1* | 12/2002 | Northway | G06F 1/1626 | 345/698 |
| 2003/0184528 A1* | 10/2003 | Kawasaki | G02F 1/13338 | 345/173 |
| 2004/0029636 A1* | 2/2004 | Wells | G07F 17/3211 | 463/32 |
| 2005/0107897 A1* | 5/2005 | Callaghan | G05B 19/4185 | 700/87 |
| 2006/0092355 A1* | 5/2006 | Yang | G02F 1/133555 | 349/114 |
| 2006/0197753 A1* | 9/2006 | Hotelling | G06F 1/1626 | 345/173 |
| 2008/0018555 A1* | 1/2008 | Kuo | G02B 17/006 | 345/8 |
| 2008/0195969 A1* | 8/2008 | Brown | G06F 3/0486 | 715/802 |
| 2009/0065578 A1* | 3/2009 | Peterson | G05B 19/048 | 235/382 |
| 2009/0091513 A1* | 4/2009 | Kuhn | G09F 9/33 | 345/4 |
| 2010/0045570 A1* | 2/2010 | Takata | G06F 3/0481 | 345/4 |
| 2010/0045705 A1* | 2/2010 | Vertegaal | A47G 19/2227 | 345/661 |
| 2010/0194705 A1* | 8/2010 | Kim | G06F 1/1626 | 345/173 |
| 2010/0275122 A1* | 10/2010 | Buxton | G06F 1/1626 | 715/728 |
| 2010/0277420 A1* | 11/2010 | Charlier | G06F 3/0481 | 345/173 |
| 2011/0163986 A1* | 7/2011 | Lee | G06F 1/1692 | 345/173 |
| 2011/0164047 A1* | 7/2011 | Pance | G06F 1/1647 | 345/581 |
| 2011/0164163 A1* | 7/2011 | Bilbrey | G06F 1/1694 | 348/333.01 |
| 2011/0187655 A1* | 8/2011 | Min | G06F 1/1643 | 345/173 |
| 2012/0001605 A1* | 1/2012 | Sakurai | G05F 1/565 | 323/280 |
| 2012/0036900 A1* | 2/2012 | Hong | D06F 39/005 | 68/139 |
| 2012/0060089 A1* | 3/2012 | Heo | G06F 1/1647 | 715/702 |
| 2012/0102438 A1* | 4/2012 | Robinson | G06F 3/011 | 715/863 |
| 2012/0102439 A1* | 4/2012 | Mitchell | G06F 3/011 | 715/863 |
| 2012/0105424 A1* | 5/2012 | Lee | G09F 9/35 | 345/212 |
| 2012/0105428 A1* | 5/2012 | Fleck | G06F 3/1431 | 345/419 |
| 2012/0105487 A1* | 5/2012 | Son | G06F 3/0487 | 345/671 |
| 2012/0127161 A1* | 5/2012 | Wallbom | G06T 19/006 | 345/419 |
| 2012/0256854 A1* | 10/2012 | Lee | G06F 1/1643 | 345/173 |
| 2012/0256886 A1* | 10/2012 | Ryu | G06F 1/1632 | 345/204 |
| 2012/0285089 A1* | 11/2012 | Artwohl | A47F 3/0434 | 49/70 |
| 2013/0073092 A1* | 3/2013 | Hosek | B25J 13/00 | 700/264 |
| 2013/0207896 A1* | 8/2013 | Robinson | G06F 3/013 | 345/158 |
| 2013/0249827 A1* | 9/2013 | Jeong | G06F 3/0414 | 345/173 |
| 2013/0260360 A1* | 10/2013 | Baurmann | G06F 3/14 | 434/365 |
| 2013/0331963 A1* | 12/2013 | Ahangar | G05B 23/0272 | 700/83 |
| 2014/0078407 A1* | 3/2014 | Green | G09F 9/35 | 348/836 |
| 2014/0098085 A1* | 4/2014 | Lee | G06F 3/0487 | 345/419 |
| 2014/0123038 A1* | 5/2014 | Ahn | G06F 3/0488 | 715/761 |
| 2014/0125599 A1* | 5/2014 | Seeley | A47F 3/043 | 345/173 |
| 2014/0285504 A1* | 9/2014 | Lin | G06T 1/60 | 345/530 |
| 2015/0024728 A1* | 1/2015 | Jang | H04M 1/72519 | 455/418 |
| 2016/0029574 A1* | 2/2016 | He | A01G 7/045 | 700/276 |
| 2016/0098108 A1* | 4/2016 | Bliss | G05B 23/0216 | 345/173 |

OTHER PUBLICATIONS

Transparent LCD on fridge, YouTube, uploaded on Sep. 4, 2011, 1 page.

Extended European Search Report for Reference No. EP102766RK900te, Application No. 15188021.8-1870, May 31, 2016, 8 pages.

* cited by examiner

TRANSPARENCY AUGMENTED INDUSTRIAL AUTOMATION DISPLAY

TECHNICAL BACKGROUND

Industrial automation is used to control machines and processes in manufacturing. Automated machines commonly control the handling of components, sub-components, and raw materials, perform fabrication processes, testing, and product handling, packaging, and shipping. Industrial automation enables precise control of industrial processes, achievement of smaller tolerances and better quality products, higher production outputs, and increased worker safety and productivity.

Industrial automation installations comprise multiple computerized devices that control industrial machines and industrial processes. The components of an industrial automation installation work together in a coordinated fashion, performing operations such as exchanging data, controlling the timing and scheduling of processes, providing information to operators or technicians, and receiving operator inputs.

Computerized devices used in an industrial automation installation include Human-Machine Interface (HMI) devices. HMI devices may include operator input devices and operator output devices. Operator output devices can include displays that display information to the operator or technician. The displayed information can include text and/or alphanumeric data, among other things.

An operator can monitor an industrial automation machine/process. In addition, a computer system is typically employed to gather data generated about the industrial automation machine/process, wherein the computer system also monitors the industrial automation machine/process. The computer system displays information to an operator for monitoring of the industrial automation machine/process by the operator.

The computer monitoring system may be remote from the industrial automation machine/process. The computer monitoring system typically includes a display screen that displays operational data for the operator to view. The display can also include representations of the industrial automation machine/process. The display can comprise 2-D or 3-D modeling and 2-D or 3-D image renderings that are displayed on the display screen. However, 2-D or 3-D modeling/rendering is costly and uses a large amount of computer resources. In addition, displays of the industrial automation machine/process at a location remote from the industrial automation machine/process may not make intuitive sense or immediate sense to the operator.

OVERVIEW

Industrial automation displays and methods are provided. The industrial automation display in one example includes a substantially transparent display panel associated with and in view of an industrial automation machine/process portion, a light-control layer formed as part of the substantially transparent display panel, and a display controller coupled to the light-control layer, with the display controller configured to receive industrial automation data related to the industrial automation machine/process portion, generate industrial automation display data using at least a portion of the industrial automation data, and display the industrial automation display data on the light-control layer of the substantially transparent display panel, wherein the industrial automation display data is viewable in conjunction with the industrial automation machine/process portion.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
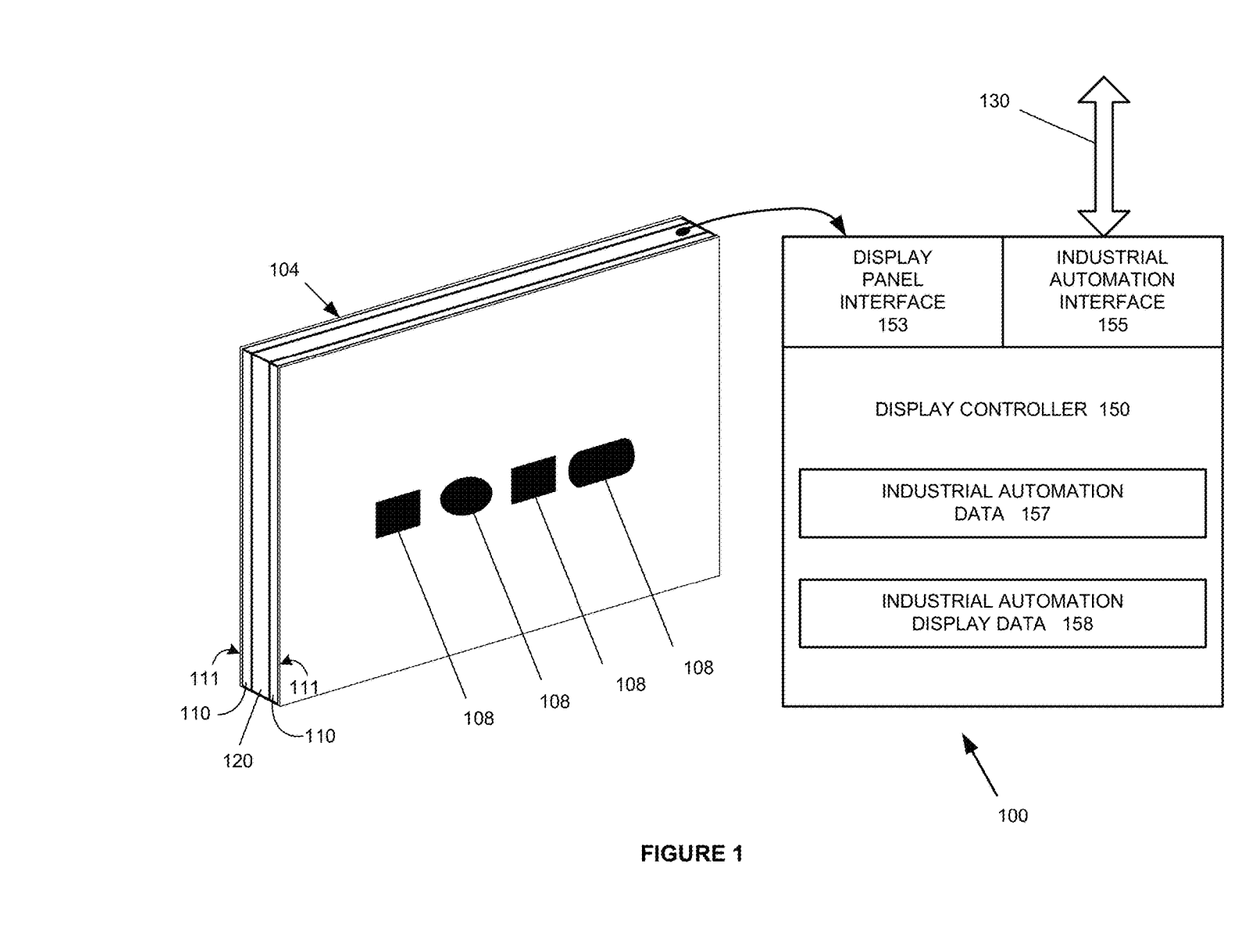
FIG. 1 shows an industrial automation display including a substantially transparent display panel and a display controller.

FIG. 1 shows an industrial automation display 100 including a substantially transparent display panel 104 and a display controller 150. The substantially transparent display panel 104 is associated with, and in view of, an industrial automation machine/process portion 101 (see FIG. 2).

The display controller 150 is coupled to the substantially transparent display panel 104. The display controller 150 can be further coupled to other devices, machines, or systems by a communication link 130. The communication link 130 in some examples comprises a communication wire, bus, optical fiber, wireless communication link, or other communication channel.

The substantially transparent display panel 104 comprises one or more transparent layers 110 affixed to a light-control layer 120. The one or more transparent layers 110 in some examples comprise glass, Plexiglas, plastic, or other substantially light-transparent materials. The one or more transparent layers 110 in some examples provide rigidity to the substantially transparent display panel 104. The one or more transparent layers 110 in some examples protect the light-control layer 120.

One or more of the transparent layers can include a transparent touch panel or transparent touch membrane coupled to transparent display panel 104. As seen in FIG. 1, touch layers 111 can include touch screen elements for receiving user input via touch, such as from an operator using a finger, stylus, pen, or other touch item. In some examples, layers 110 includes touch layers 111, while in other examples these layers are separate and adhered (such as by optical bonding) to other layers of panel 104. One or both sides of panel 104 can include a touch layer, with separate touch panels or membranes coupled to each face or side. The touch layers 111 can comprise capacitive, resistive, infrared, or visual touch panels, among other types, for receiving user input via touch. In dual-sided panel examples, a touch panel or membrane can be included on both sides of panel 104.

The light-control layer 120 is formed as part of the substantially transparent display panel 104. The light-control layer 120 in some examples is affixed to one or more transparent layers. The light-control layer 120 in the example of the figure is sandwiched between two transparent layers 110. Alternatively, the light-control layer 120 can be affixed to a single transparent layer 120. The light-control layer 120 comprises a substantially light-transmissive panel that is configured to be electrically actuated by the display controller 150. The light-control layer 120 controls transmission of impinging light through the display panel 104. The light-control layer 120 is electrically actuated in some examples to selectively and substantially block, filter, or transmit impinging light. The light-control layer 120 in some examples comprises a liquid-crystal display (LCD) element.

The light-control layer 120 in some examples is actuated to substantially block impinging light, substantially transmit the impinging light, and/or filter the impinging light. The display controller 150 in some examples is configured to modify a color, frequency, polarization, or light transmissivity of the industrial automation display data. The light-control layer 120 in some examples is actuated to filter the impinging light to generate a predetermined polarization characteristic or filter the impinging light to pass a predetermined light wavelength or light wavelength band. The light-control layer 120 in some examples is actuated to filter impinging light by regions of the display panel 104 and therefore create regions of predetermined light transmissivity or create regions of predetermined light wavelength transmissivity.

The display controller 150 is coupled to the light-control layer 120 and is configured to actuate and control the light-control layer 120. The display controller 150 receives industrial automation data 152 from one or more external sources, such as from monitoring computers, sensors, meters, and such. The display controller 150 processes at least a portion of the industrial automation data 152 to create industrial automation display data 153. The light-control layer 120 in some examples is actuated to generate and display the industrial automation display data 153. The industrial automation display data 153 comprises any manner of graphical representations, text, symbols, videos, animations, or other information derived from the industrial automation data 152 and that serves to convey the industrial automation data 152 to the operator. The display controller 150 in some examples is configured to overlay the industrial automation display data 153 over the industrial automation machine/process portion 101. The display controller 150 in some examples is configured to actuate the light-control layer 120 to partially or fully obscure predetermined regions of the substantially transparent display panel 104.

The industrial automation display data 153 in some examples comprises one or more display items 108 that are generated from the industrial automation data 152. The one or more display items 108 are generated and presented by the light-control layer 120, under the control of the display controller 150. The light-control layer 120 in some examples is actuated to generate and display the one or more predetermined display items 108. The light-control layer 120 provides the one or more display items 108 to be viewed on the display panel 104 while the operator views the industrial automation machine/process portion 101 through the display panel 104. The one or more display items 108 comprise images, symbols, or text. The one or more display items 108 comprise representations of machine portions or process portions. The one or more display items 108 comprise videos, animations, or time-varying information representations. The one or more display items 108 in some examples comprises component display items 108A, condition information display items 108B, operational information display items 108C, and operator input display items 108D (see FIG. 2).

The one or more display items 108 in some examples completely obscure items behind the one or more display items 108 in some examples. Alternatively, the one or more display items 108 allow a portion of the impinging light to pass through the display panel 104, wherein the operator can see through the one or more display items 108 and see items behind the one or more display items 108. As a result, the operator can view the one or more display items 108 together with viewing the associated industrial automation machine/process portion 101.

The display controller 150 in some examples is configured to receive industrial automation data 157 related to the industrial automation machine/process portion 101, generate industrial automation display data 158 using at least a portion of the industrial automation data 157, and display the industrial automation display data 158 on the light-control layer 120 of the substantially transparent display panel 104, wherein the industrial automation display data 158 is viewable in conjunction with the industrial automation machine/process portion 101.

The substantially transparent display panel 104 in some examples comprises a fixed or mobile electronic operator interface. The substantially transparent display panel 104 in some examples is mounted as a window to the machine or process that the operator looks through to monitor an operation or operations. The substantially transparent display panel 104 in some examples annunciates operational data and errors right on/in front of (or associated with) the associated machine or process, and in the proper location. The substantially transparent display panel 104 in some examples can be used in place of a simple transparent operator viewing panel.

The substantially transparent display panel 104 in some examples provides an augmented reality view, where the actual machine or process is shown with additional text and/or graphical information to assist the operator in determining and/or diagnosing problems in the industrial automation environment. The substantially transparent display panel 104 in some examples presents traditional HMI content, as well as using position sensors to determine the relationship of the device to the surroundings and provide an augmented reality view that is projected directly over a machine or process. The substantially transparent display panel 104 in some examples displays a problem annunciated on the panel and can further display information about the failure. The substantially transparent display panel 104 makes unnecessary the use of 2-D or 3-D models and 2-D or 3-D displays of the industrial automation machine/process portion 101.

Figure 2:
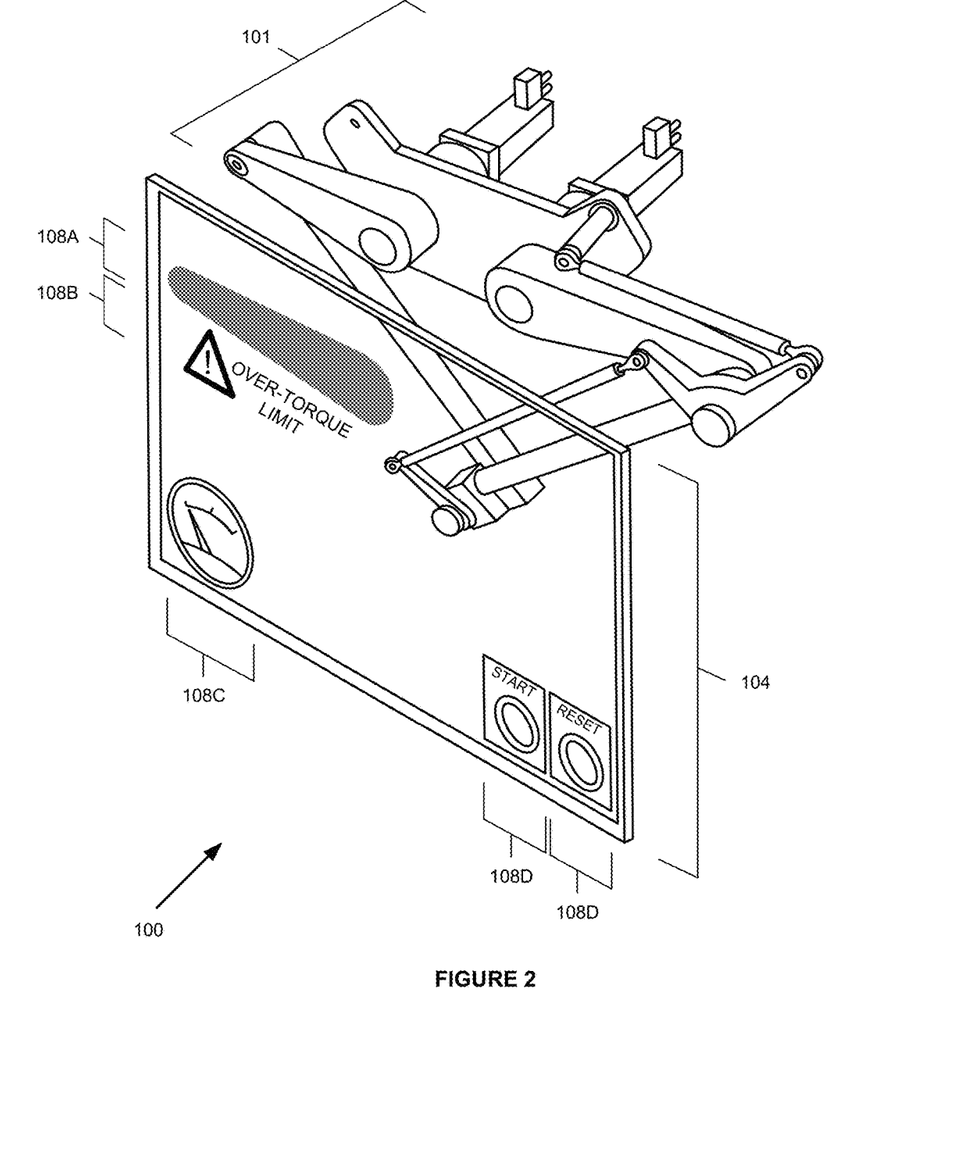
FIG. 2 shows an industrial automation display including the substantially transparent display panel, the display controller, and an associated industrial automation machine/process portion.

FIG. 2 shows an industrial automation display 100 including the substantially transparent display panel 104, the display controller 150, and an associated industrial automation machine/process portion 101. The industrial automation machine/process portion 101 can be viewed by an operator through the substantially transparent display panel 104. It should be understood that the substantially transparent display panel 104 can be mounted to a frame, cabinet, divider, door, or other structure that supports the substantially transparent display panel 104. In addition, the substantially transparent display panel 104 can be part of a wall, divider, door, or other structure that separates the operator from the industrial automation machine/process portion 101, such as for safety purposes, for example.

In examples such as panel-mounted or door-mounted displays, an operator might open the door or panel. A dual-sided display can be employed which will display content to an operator based on which side the operator is interacting with, such as by detection which side an operator has touched. A dual-sided display can also detect an opening of the door or panel and switch sides for interaction with an operator responsive to the door or panel opening. The display panel can receive external input from a door open/close sensor or switch which can be used to switch active sides of the display panel.

The substantially transparent display panel 104 can display one or more display items 108. The one or more display items 108 can be displayed substantially in real time. The one or more display items 108 can be displayed to mimic portions of the industrial automation machine/process portion 101. The one or more display items 108 can be displayed to convey additional information about the industrial automation machine/process portion 101. In some examples, the one or more display items 108 comprise component display items 108A, condition information display items 108B, operational information display items 108C, and/or operator input display items 108D.

The component display item 108A comprises a representation of at least a portion of the industrial automation machine/process potion 101. In the example shown, the component display item 108A comprises a movable arm of the industrial automation machine/process portion 101. Consequently, the component display item 108A can be shown by the substantially transparent display panel 104 in positions that follow the actual arm in some examples. Alternatively, the component display item 108A can be shown at a maximum allowable travel position or positions, wherein the operator can visually see whether the industrial automation machine/process portion 101 is operating properly.

The condition information display item 108B comprises condition information for the component display item 108A, and can comprise symbols, text, graphics, et cetera that convey condition information to the operator. In the example of the figure, a warning triangle symbol is displayed, along with "over-torque limit" text that informs the operator that the movable arm component of the industrial automation machine/process portion 101 is operating at or above a torque limit.

The operational information display item 108C comprises an indicator that conveys information such as a power consumption level, a force/torque level, a liquid level, or other information related to the industrial automation machine/process portion 101. The substantially transparent display panel 104 can comprise operational information in the shape of gauges or other visual or graphical indicators that convey operational information to the operator.

The operator input display items 108D comprise buttons or other input devices. The operator input display items 108D in some examples include touchscreen regions formed as part of or affixed to the substantially transparent display panel 104, such as capacitive, resistive, or infrared touch control regions. The touchscreen regions 108D include corresponding displays that visually represent the particular controls or functions in some examples. The operator input display items 108D enable the operator to control or affect the industrial automation machine/process portion 101. The substantially transparent display panel 104 can be changed in response to operator actuation of an operator input display item 108D, for example.

In further examples, textual or graphical instructions can be provided to a user on panel 104. For example, when panel 104 is coupled to a portion of an industrial machine or process that requires repair or user intervention for operation, panel 104 can include instructions for the operator. These instructions can indicate a location of a faulty portion of the machine or process, or provide feedback to an operator about direction and placement of some object within the machine or process to assist the operator in performing a task. These instructions can be contextual and change according to different steps already performed by an operator or can indicate placement of objects or repair materials based on a current state of the machine or process.

Figure 3:
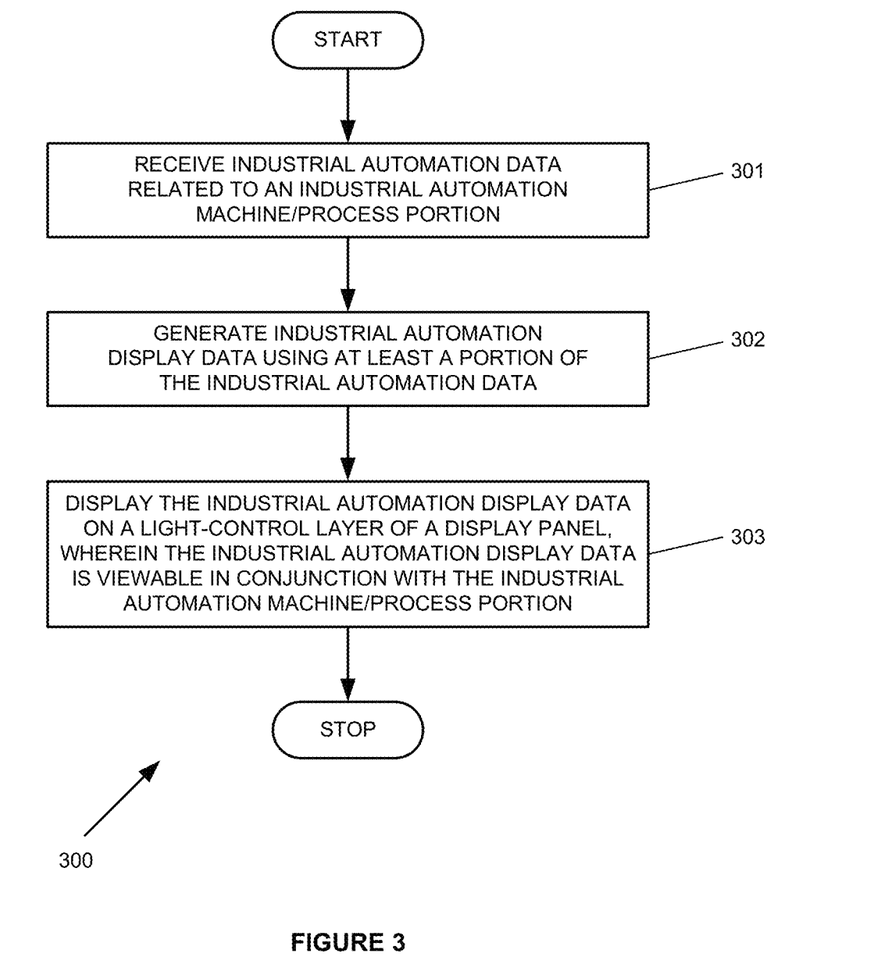
FIG. 3 is a flowchart of an exemplary industrial automation display method.

FIG. 3 is a flowchart 300 of an exemplary industrial automation display method. In step 301, a display controller receives industrial automation related to an industrial automation machine/process portion. The display controller is coupled to a light-control layer of a substantially transparent display panel that is associated with and in view of the industrial automation machine/process portion.

In step 302, the display controller generates industrial automation display data using at least a portion of the industrial automation data. The industrial automation display data comprises display data to be displayed on the light-control layer of the substantially transparent display panel. The industrial automation display data comprises any manner of graphical representations, text, symbols, videos, animations, or time-varying information that serves to convey the industrial automation data to the operator. The industrial automation display data in some examples comprises one or more display items that are generated from the industrial automation data.

In step 303, the display controller displays the industrial automation display data on the light-control layer of the substantially transparent display panel. Consequently, the industrial automation display data is viewable in conjunction with the industrial automation machine/process portion.

Figure 4:
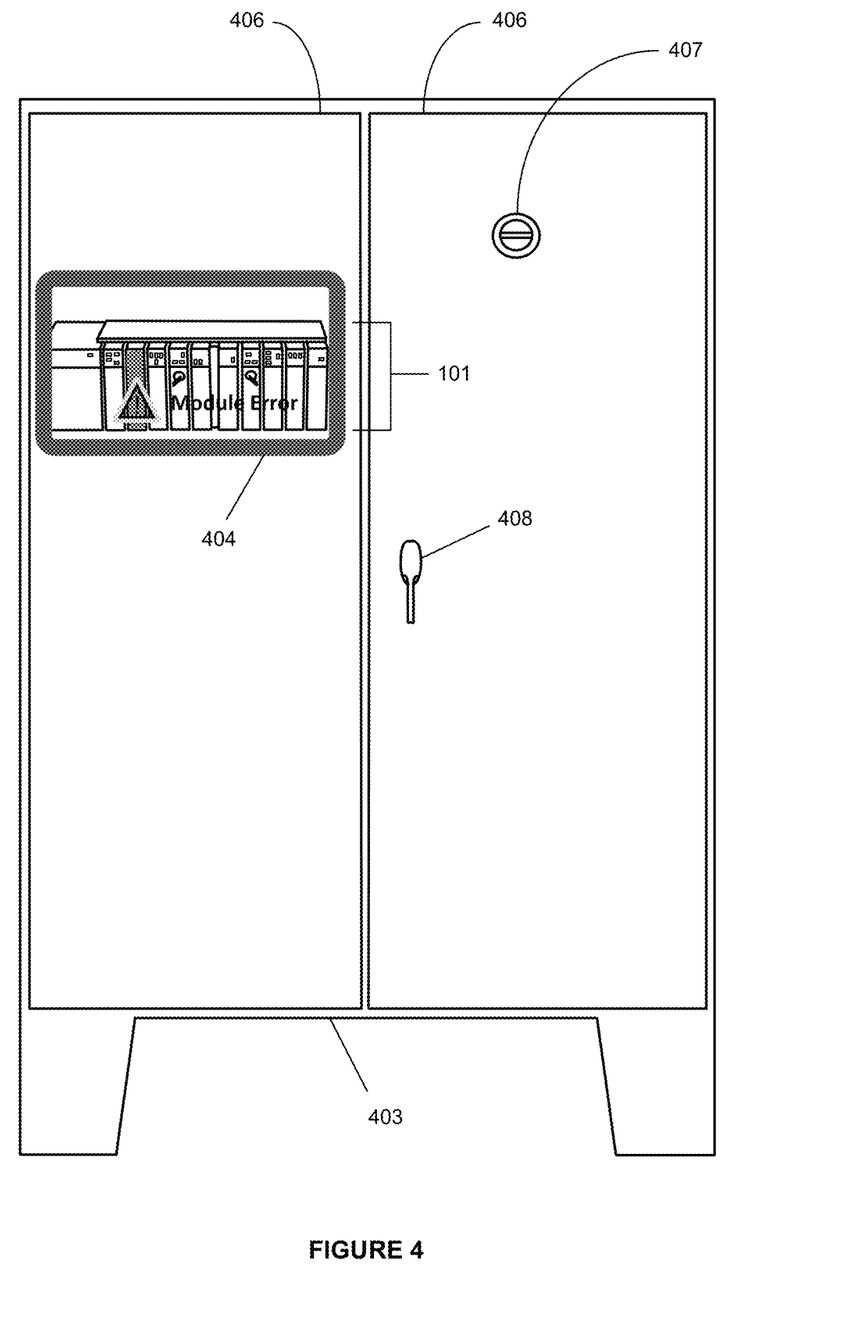
FIG. 4 shows an industrial automation cabinet including one or more cabinet doors and a substantially transparent display panel located in a cabinet door.

FIG. 4 shows an industrial automation cabinet 403 including one or more cabinet doors 406 and a substantially transparent display panel 404 located in a cabinet door 406. An operator can look through the substantially transparent display panel 404 to inspect at least a portion of the interior of the industrial automation cabinet 403. The cabinet doors 406 can further include one or more door handles 408 and one or more operator interaction devices 407. An industrial automation machine/process portion 101 can be seen through the substantially transparent display panel 404. Consequently, an operator can look through the substantially transparent display panel 404 and inspect the industrial automation machine/process portion 101. Further, additional information can be displayed on the substantially transparent display panel 404 for the operator's benefit. As a result, the operator can visually inspect the condition and/or operation of the industrial automation machine/process portion 101 without needing to open the cabinet door or doors 406. Moreover, additional condition information and/or operational information for the industrial automation machine/process portion 101 can be presented to the operator.

Figure 5:
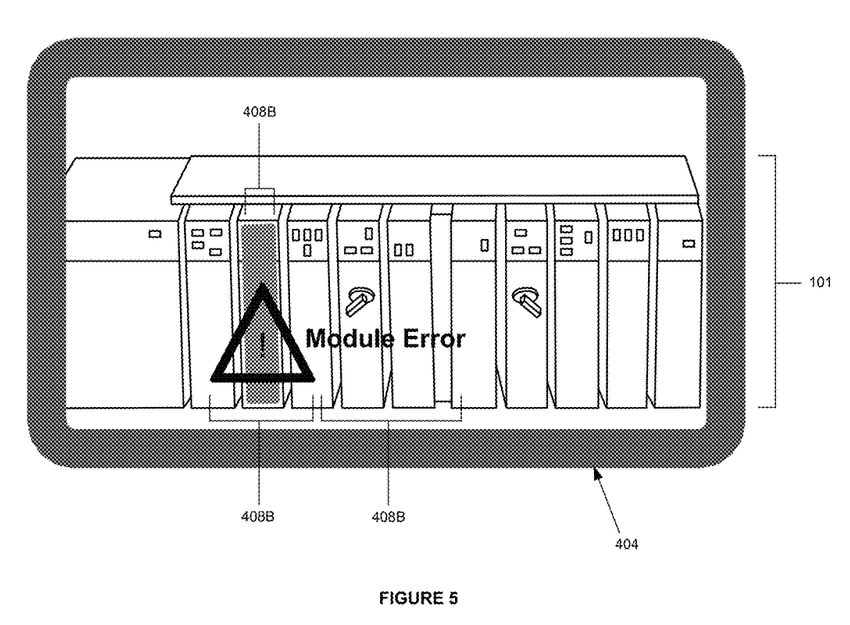
FIG. 5 shows further detail of the substantially transparent display panel of the industrial automation cabinet.

FIG. 5 shows further detail of the substantially transparent display panel 404 of the industrial automation cabinet 403. In this figure, additional display items are included on the substantially transparent display panel 404. In this example, the substantially transparent display panel 404 includes a first condition information display item 408B comprising a grayed-out component of the industrial automation machine/process portion 101. The first condition information display item 408B therefore indicates a change in condition or non-normal condition in the grayed-out component.

In this example, the substantially transparent display panel 404 includes a second condition information display item 408B comprising a warning triangle symbol with an exclamation mark at the center. The second condition information display item 408B comprises a symbolic warning of a problem condition or unacceptable condition in the grayed-out component. The second condition information display item 408B in some examples conveys a severity indication to the operator.

In this example, the substantially transparent display panel 404 includes a third condition information display item 408B comprising a text explanation or text information for the grayed-out component and the problem condition or unacceptable condition. The third condition information display item 408B can include any manner of text information to be displayed to the operator. In further examples a button could be included on panel 404, such as a module reset button, that can receive user input from an operator and attempt to clear a fault condition.

Figure 6:
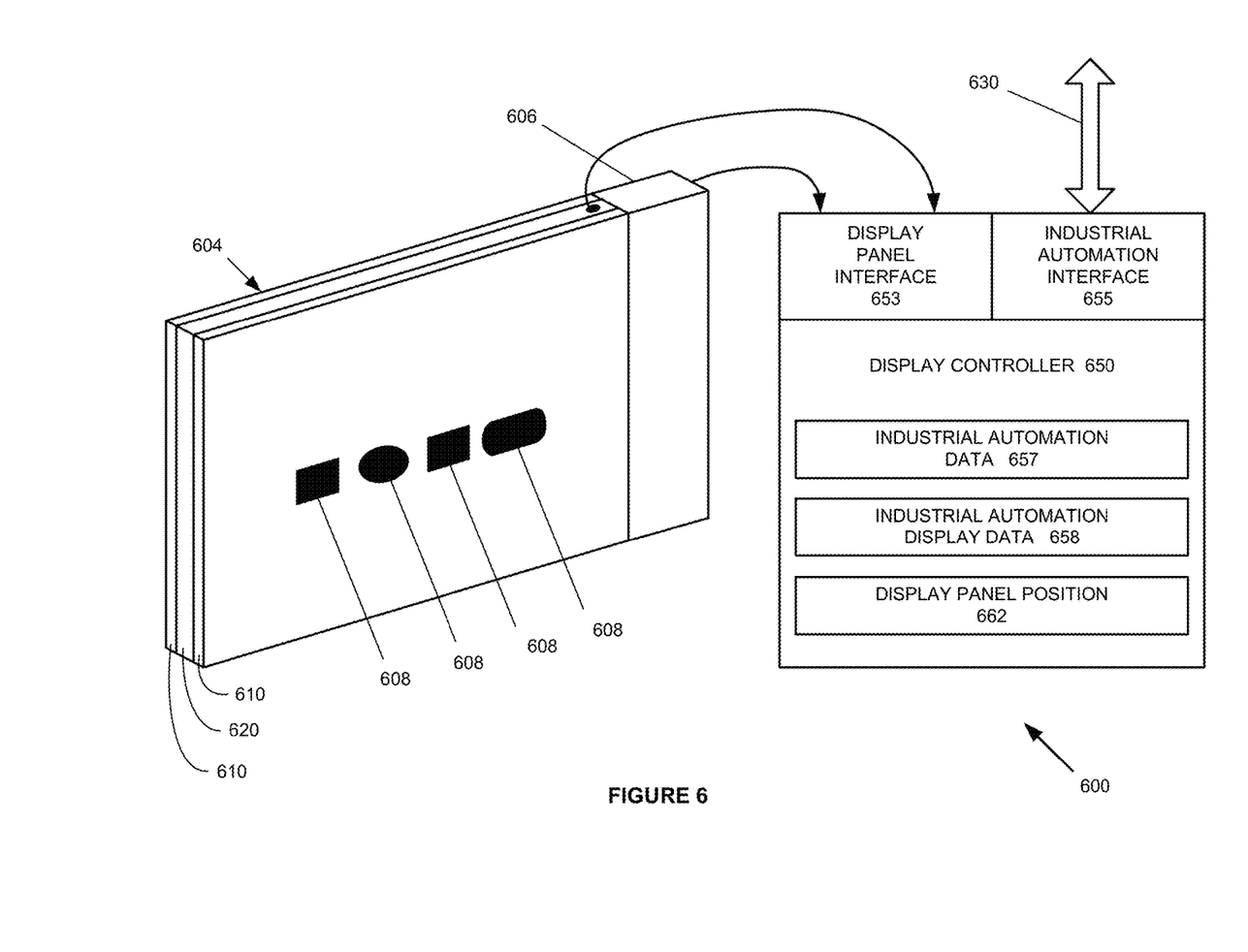
FIG. 6 shows an industrial automation display including a substantially transparent display panel, a position sensor, and a display controller.

FIG. 6 shows an industrial automation display 600 including a substantially transparent display panel 604, a position sensor 606, and a display controller 650. The position sensor 606 detects a position of the substantially transparent display panel 604, including linear movement/position of the substantially transparent display panel 604, rotational movement/position of the substantially transparent display panel 604, and/or orientation of the substantially transparent display panel 604. The industrial automation display 660 can be the same as the industrial automation display 100 of FIG. 1 or can be different.

In this example, the display controller 650 receives a display panel position 662 from the display panel position sensor 606. The display controller 650 in some examples is configured to receive industrial automation data 657 related to the industrial automation machine/process portion 101, receive the display panel position 662 from the display panel position sensor 606, generate industrial automation display data 658 using at least a portion of the industrial automation data 657 and using the display panel position 662, display at least a portion of the industrial automation display data 657 on the light-control layer 620 of the substantially transparent display panel 604, wherein the industrial automation display data 657 is viewable in conjunction with the industrial automation machine/process portion 101, and change a display orientation based on a position/orientation change in the display panel position 662.

In other examples, user input can change a position/orientation change in the elements displayed on display panel 604, where input from an operator is utilized to change the orientation of the content on the display. For example, the operator could touch panel 604 on either face of panel 604 and the display would reorient the content to be readable from that side. Input buttons can be displayed on the screen that could be used by the operator to change the display's orientation. Position sensor 606 can be included in display control 650 or included in separate equipment. Additionally, position sensor 606 can detect the position of hands of an operator to aid or direct placement of an object in the industrial machine or process.

The substantially transparent display panel 604 comprises one or more transparent layers 610 affixed to a light-control layer 620. The one or more transparent layers 610 in some examples comprise glass, Plexiglas, plastic, or other substantially light-transparent materials. The one or more transparent layers 610 in some examples provide rigidity to the substantially transparent display panel 604. The one or more transparent layers 610 in some examples protect the light-control layer 620. One or more of the transparent layers 610 can include a transparent touch panel or transparent touch membrane coupled to transparent display panel 604. The touch layers can include touch screen elements for receiving user input via touch, such as from an operator using a finger, stylus, pen, or other touch item. In some examples, layers 610 includes touch layers, while in other examples these layers are separate and adhered (such as by optical bonding) to other layers of panel 604. One or both sides of panel 604 can include a touch layer, with separate touch panels or membranes coupled to each face or side. The touch layers can comprise capacitive, resistive, infrared, or visual touch panels, among other types, for receiving user input via touch. In dual-sided panel examples, a touch panel or membrane can be included on both sides of panel 604.

Figure 7:
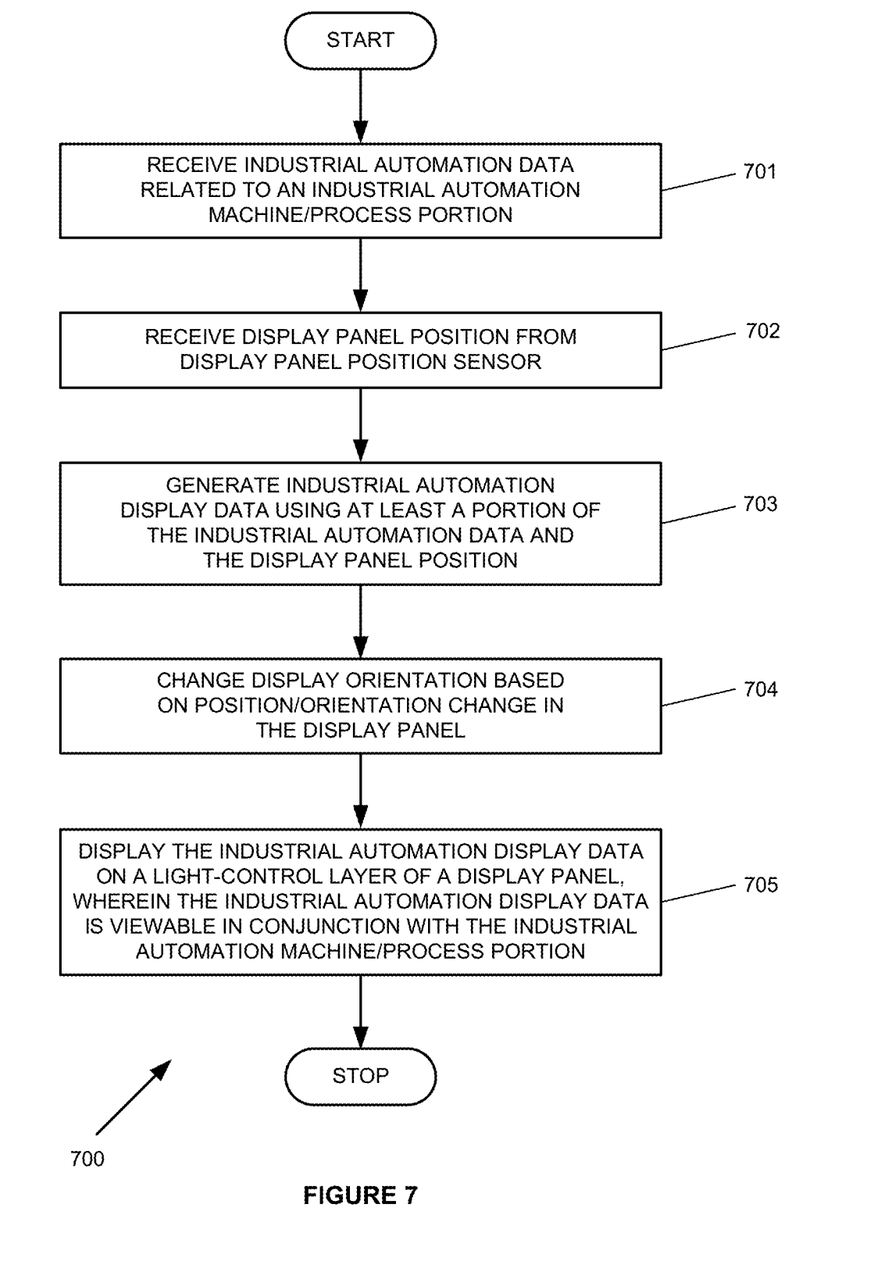
FIG. 7 is a flowchart of an exemplary industrial automation display method.

FIG. 7 is a flowchart 700 of an exemplary industrial automation display method. In step 701, a display controller receives industrial automation related to an industrial automation machine/process portion. The display controller is coupled to a light-control layer of a substantially transparent display panel that is associated with and in view of the industrial automation machine/process portion.

In step 702, a display panel position is received from a display panel position sensor (or sensors). The display panel position comprises information about a position and/or orientation of the substantially transparent display panel.

In step 703, the display controller generates industrial automation display data using at least a portion of the industrial automation data and using the display panel position. The industrial automation display data comprises display data to be displayed on the light-control layer of the substantially transparent display panel, as previously discussed. The display panel position is used to determine a positioning and/or orientation of the display to be displayed on the substantially transparent display panel.

In step 704, the display orientation is changed based on a position/orientation change in the display panel. The display orientation can be changed on a change in position or location of the substantially transparent display panel. The display orientation can be changed based on a change in orientation of the substantially transparent display panel.

In step 705, the display controller displays the industrial automation display data on the light-control layer of the substantially transparent display panel. Consequently, the industrial automation display data is viewable in conjunction with the industrial automation machine/process portion.

Figure 8:
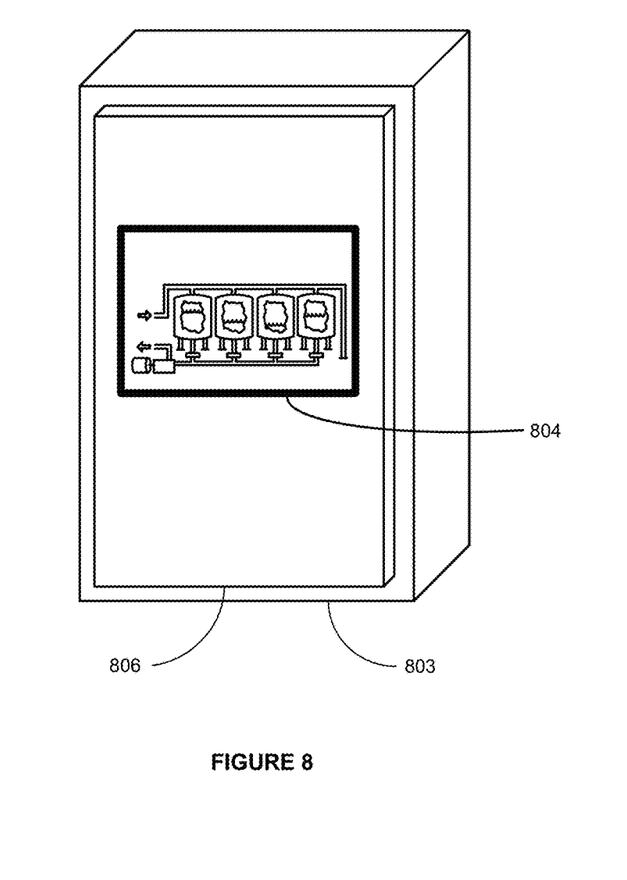
FIG. 8 shows an industrial automation cabinet including a cabinet door and a substantially transparent display panel located in the cabinet door.

FIG. 8 shows an industrial automation cabinet 803 including a cabinet door 806 and a substantially transparent display panel 804 located in the cabinet door 806. An operator can look through the substantially transparent display panel 804 to inspect at least a portion of the interior of the industrial automation cabinet 803. An industrial automation machine/process portion 101 can be seen through the substantially transparent display panel 804. In the figure, the substantially transparent display panel 804 shows multiple tanks of constituents for use in an industrial automation process, with the display showing levels of constituents and flows/transfers of constituents.

Consequently, an operator can look through the substantially transparent display panel 104 and inspect an industrial automation machine/process portion. In addition, information can be displayed on the substantially transparent display panel 104 for the operator's benefit. As a result, the operator can visually inspect the condition and/or operation of the industrial automation machine/process portion 101 without needing to open the cabinet door or doors 406. Condition information and/or operational information for the industrial automation machine/process portion 101 can additionally be presented to the operator by the substantially transparent display panel 804.

Figure 9:
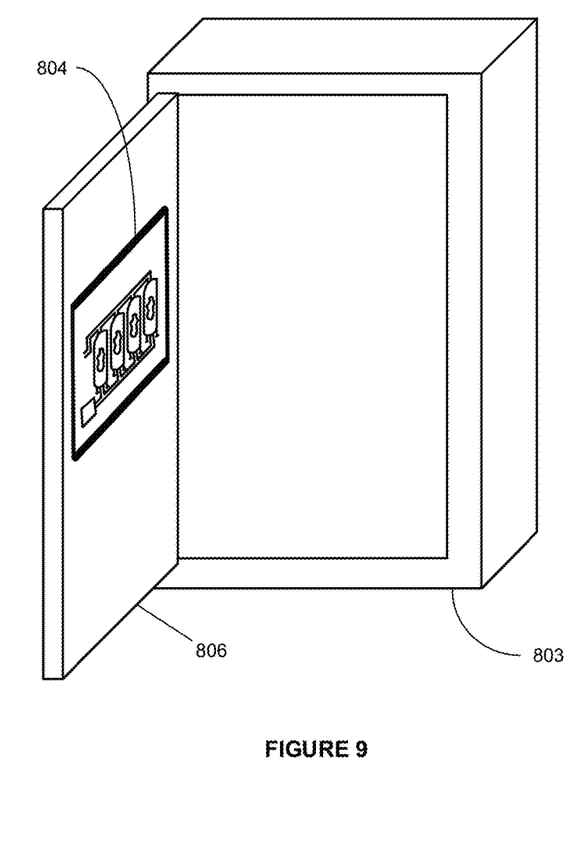
FIG. 9 shows the door of the industrial automation cabinet of FIG. 8 in an open position.

FIG. 9 shows the door 806 of the industrial automation cabinet 803 of FIG. 8 in an open position. The corresponding display controller can horizontally flip the image presented on the substantially transparent display panel 804 so that the image is properly oriented when the operator is looking at the inner surface of the substantially transparent display panel 804. When the door 806 is closed one again, the substantially transparent display panel 804 can be horizontally flipped again to be properly oriented when viewed from the outside.

Figure 10:
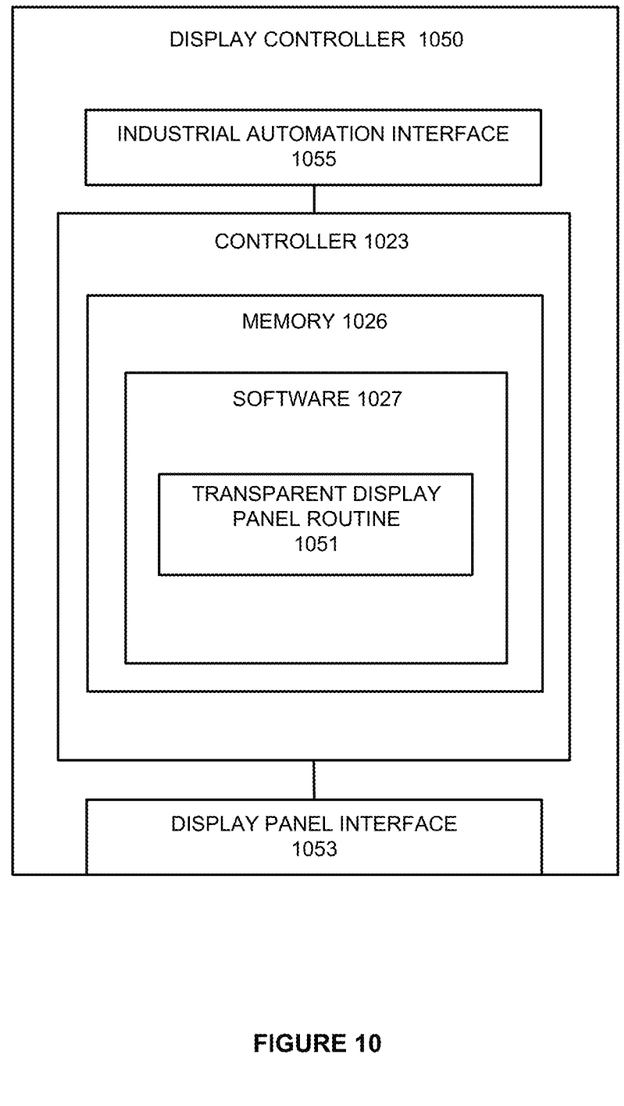
FIG. 10 shows detail of an exemplary display controller.

FIG. 10 shows detail of an exemplary display controller 1050. The display controller 1050 includes a display panel interface 1053, an industrial automation interface 1055, a controller 1023 coupled to the display panel interface 1053 and to the industrial automation interface 1055, and a memory 1026 in communication with the controller 1023. The memory 1026 can be separate from or included in the controller 1023.

The memory 1026 in the example shown includes software 1027. In some examples, the software 1027 comprises operating instructions that configure the controller 1023, when executed by the display controller 1050 in general or the controller 1023 in particular, to direct the controller 1023 to perform industrial automation display operations. Other data, such as operational data, may also be stored in the memory 1026. The software 1027 in one example comprises at least a transparent display panel routine 1051. The transparent display panel routine 1051 controls a transparent display panel in some examples.

The controller 1023 may comprise a microprocessor and other circuitry that retrieves and executes the software 1027 from the memory 1026. The controller 1023 may be implemented within a single processing device, but may also be distributed across multiple processing devices or sub-systems that cooperate in executing program instructions. Examples of the controller 1023 include general purpose central processing units, application specific processors, and logic devices, as well as any other type of processing device, combinations, or variations.

The memory 1026 may comprise any non-transitory computer readable storage media readable by the controller 1023 and capable of storing the software 1027. The memory 1026 may include volatile and nonvolatile, removable and non-removable media implemented in any method or technology for storage of information, such as computer readable instructions, data structures, program modules, or other data. The memory 1026 may be independent from or integrated into the controller 1023. The memory 1026 can comprise additional elements, such as a memory controller, capable of communicating with the controller 1023. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media.

In addition to storage media, in some implementations the memory 1026 may also include communication media over which the software 1027 may be communicated internally or externally. The memory 1026 may be implemented as a single storage device but may also be implemented across multiple storage devices or sub-systems co-located or distributed relative to each other. The memory 1026 may comprise additional elements capable of communicating with the controller 1023 or possibly other systems.

The software 1027 may be implemented in program instructions and among other functions and may, when executed by the controller 1023, direct the controller 1023 to operate as described herein. In particular, the program instructions may include various components or modules that cooperate or otherwise interact to implement at least a portion of the display controller 1050. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. The software 1027 in the examples comprises computer programs, firmware, or some other form of machine-readable processing instructions. The software 1027 may include an operating system, utilities, drivers, network interfaces, applications, virtual machines, or some other type of software. The software 1027 may include additional processes, programs, or components, such as operating system software or other application software. The software 1027 may also comprise firmware or some other form of machine-readable processing instructions executable by the controller 1023.

In general, the software 1027, when loaded into the controller 1023 and executed, may transform a suitable apparatus, system, or device from a general-purpose computing system into a special-purpose computing system customized to control a transparent display panel, among other operations. Indeed, encoding the software 1027 on the memory 1026 may transform the physical structure of the memory 1026. The specific transformation of the physical structure may depend on various factors in different implementations of this description. Examples of such factors may include, but are not limited to the technology used to implement the storage media of the memory 1026 and whether the computer-storage media are characterized as primary or secondary storage, as well as other factors.

The display panel interface 1053 and the industrial automation interface 1055 may include communication connections and devices that allow for communication with other computing systems over a communication network or collection of networks. The display panel interface 1053 and the industrial automation interface 1055 may include user input and output devices for being controlled by a user. In further examples, a visual or infrared monitoring sensors or cameras can be employed to monitor an operator, tools, or other positions of operator interactions with a display panel. These sensors or cameras, such as natural user interfaces, can communicate with display panel interface 1053 and the industrial automation interface 1055, or other communications interfaces.

The display panel interface 1053 and the industrial automation interface 1055 comprise a network card, network interface, port, or interface circuitry that allows the display controller 1050 to communicate over a network or networks. The display panel interface 1053 and the industrial automation interface 1055 may also include a memory device, software, processing circuitry, or some other device. The display panel interface 1053 and the industrial automation interface 1055 can use any suitable communication protocol to exchange communications.

The display panel interface 1053 and the industrial automation interface 1055 may include components that communicate over communication links, such as network cards, ports, RF transceivers, processing circuitry and software, or other communication components. The display panel interface 1053 and the industrial automation interface 1055 may be configured to communicate over electrically conductive, wireless, optical, or other links.

The display panel interface 1053 and the industrial automation interface 1055 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An industrial automation display, comprising:
   a substantially transparent display panel affixable to a rotatable cabinet door, the substantially transparent display panel associated with and in view of an industrial automation process portion;
   a touch panel formed as part of the substantially transparent display panel on two sides of the substantially transparent display panel and configured to receive a touch input from an operator;
   a light-control layer formed as part of the substantially transparent display panel; and
   a display controller coupled to the light-control layer, wherein the display controller is configured to:
      receive industrial automation data related to the industrial automation process portion;
      generate industrial automation display data using at least a portion of the industrial automation data; and
      display the industrial automation display data on the light-control layer of the substantially transparent display panel and in a display orientation based on which of the two sides receives an operator touch interaction;
   wherein the industrial automation display data is viewable in conjunction with the industrial automation process portion; and
   wherein the display controller is further configured to switch an active side of the substantially transparent display panel based on an input from a door open/close sensor.

2. The industrial automation display of claim 1, wherein the industrial automation display data comprises ones of symbols, text, graphical representations, and other information derived from the industrial automation data.

3. The industrial automation display of claim 1, comprising:
   the display controller configured to overlay the industrial automation display data over the industrial automation process portion.

4. The industrial automation display of claim 1, comprising:
   the display controller configured to actuate the light-control layer to partially or fully obscure predetermined regions of the substantially transparent display panel.

5. The industrial automation display of claim 1, comprising:
   the light-control layer configured to selectively block, filter, or transmit impinging light.

6. The industrial automation display of claim 1, wherein the display controller is further configured to:
   display a component display item comprising a representation of the industrial automation process portion; and
   display the component display item in one or more positions that follow the industrial automation process portion.

7. An industrial automation display, comprising:
   a substantially transparent display panel associated with and in view of an industrial automation process portion, wherein the substantially transparent display panel comprises a first side and a second side;
   a touch panel formed as part of the substantially transparent display panel on the first and second sides of the substantially transparent display panel and configured to receive a touch input from an operator;
   a light-control layer formed as part of the substantially transparent display panel;
   a display panel position sensor configured to generate a display panel position; and
   a display controller coupled to the light-control layer and to the display panel position sensor, wherein the display controller is configured to:
      receive industrial automation data related to the industrial automation process portion;
      receive the display panel position from the display panel position sensor;
      generate industrial automation display data using at least a portion of the industrial automation data and using the display panel position;
      display at least a portion of the industrial automation display data on the light-control layer of the substantially transparent display panel; and
      orient the display of the at least a portion of the industrial automation display data in a first display orientation in response to a touch input interaction with the touch panel on the first side and in a second display orientation in response to a touch input interaction with the touch panel on the second side;
   wherein the industrial automation display data is viewable in conjunction with the industrial automation process portion; and wherein the display controller is further configured to switch an active side of the substantially transparent display panel based on an input from a door open/close sensor.

8. The industrial automation display of claim 7, wherein the industrial automation display data comprises ones of symbols, text, graphical representations, and other information derived from the industrial automation data.

9. The industrial automation display of claim 7, comprising:
the display controller configured to overlay the industrial automation display data over the industrial automation process portion.

10. The industrial automation display of claim 7, comprising:
the display controller configured to actuate the light-control layer to partially or fully obscure predetermined regions of the substantially transparent display panel.

11. The industrial automation display of claim 7, comprising:
the light-control layer configured to selectively block, filter, or transmit impinging light.

12. An industrial automation display method, comprising:
in a display controller coupled to a light-control layer of a substantially transparent display panel associated with and in view of an industrial automation process portion, receiving industrial automation data related to the industrial automation process portion;
in the display controller, generating industrial automation display data using at least a portion of the industrial automation data;
in a transparent touch panel coupled to the substantially transparent display panel on a first side and a second side of the substantially transparent display panel, receiving a touch input from an operator on one of the first side and the second side;
in the display controller, displaying the industrial automation display data on the light-control layer of the substantially transparent display panel in a display orientation based on which of the first side and the second side received the touch input, wherein the industrial automation display data is viewable in conjunction with the industrial automation process portion; and
in the display controller, switching an active side of the substantially transparent display panel based on an input from a door open/close sensor.

13. The industrial automation display method of claim 12, wherein the industrial automation display data comprises ones of symbols, text, graphical representations, and other information derived from the industrial automation data.

14. The industrial automation display method of claim 12, comprising:
the display controller configured to overlay the industrial automation display data over the industrial automation process portion.

15. The industrial automation display method of claim 12, comprising:
the display controller configured to actuate the light-control layer to partially or fully obscure predetermined regions of the substantially transparent display panel.

16. The industrial automation display method of claim 12, comprising:
the light-control layer is configured to selectively block, filter, or transmit impinging light.

17. The industrial automation display method of claim 12, wherein the display orientation causes the industrial automation display data to be readable from the first side or the second side that received the touch input.

* * * * *